United States Patent
Park et al.

(10) Patent No.: US 10,250,943 B2
(45) Date of Patent: Apr. 2, 2019

(54) METHOD, APPARATUS, AND COMPUTER READABLE RECORDING MEDIUM FOR AUTOMATIC GROUPING AND MANAGEMENT OF CONTENT IN REAL-TIME

(75) Inventors: Yong-gook Park, Gyeonggi-do (KR); Bum-joo Lee, Gyeonggi-do (KR); Say Jang, Gyeonggi-do (KR); Ji-su Jung, Chungcheongbuk-do (KR); Seung-hwan Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 622 days.

(21) Appl. No.: 13/605,416

(22) Filed: Sep. 6, 2012

(65) Prior Publication Data

US 2013/0176338 A1 Jul. 11, 2013

(30) Foreign Application Priority Data

Jan. 10, 2012 (KR) .................. 10-2012-0003084

(51) Int. Cl.
| | |
|---|---|
| *G09G 5/00* | (2006.01) |
| *H04N 21/462* | (2011.01) |
| *G09G 5/14* | (2006.01) |
| *H04N 21/431* | (2011.01) |
| *H04N 21/433* | (2011.01) |

(52) U.S. Cl.
CPC ............ *H04N 21/462* (2013.01); *G09G 5/14* (2013.01); *H04N 21/4312* (2013.01); *H04N 21/4332* (2013.01); *G09G 5/003* (2013.01); *G09G 2354/00* (2013.01)

(58) Field of Classification Search
CPC .................... H04N 21/462; H04N 21/4332
USPC ........................... 345/634, 638, 641
See application file for complete search history.

(56) References Cited

U.S. PATENT DOCUMENTS

| | | | | |
|---|---|---|---|---|
| 7,136,529 | B2* | 11/2006 | Furuhashi | ......... G06F 17/30244 382/209 |
| 7,991,234 | B2 | 8/2011 | Hamasaki et al. | |
| 8,879,004 | B2 | 11/2014 | Oami et al. | |

(Continued)

FOREIGN PATENT DOCUMENTS

| | | |
|---|---|---|
| JP | 10-254746 | 9/1998 |
| JP | 2001-282838 | 10/2001 |

(Continued)

OTHER PUBLICATIONS

English machine translation of Hiroshi (JP 10-254746 A, 1998).*

(Continued)

*Primary Examiner* — Barry Drennan
*Assistant Examiner* — Terrell M Robinson
(74) *Attorney, Agent, or Firm* — The Farrell Law Firm, P.C.

(57) ABSTRACT

A method and apparatus for managing content, where content received or generated in a device is automatically grouped and managed in real-time, and a computer readable recording medium having recorded thereon a program for executing the method which includes detecting whether content is received or generated by a device, grouping the received or generated content with another received or generated content, and displaying the grouped content on the device, wherein the another content includes at least one content received or generated before the detected received or generated content.

15 Claims, 15 Drawing Sheets

(56) References Cited

U.S. PATENT DOCUMENTS

| | | |
|---|---|---|
| 2004/0205286 A1 | 10/2004 | Bryant et al. |
| 2006/0195475 A1 | 8/2006 | Logan et al. |
| 2007/0112852 A1* | 5/2007 | Sorvari et al. ............. 707/104.1 |
| 2007/0136286 A1* | 6/2007 | Webster et al. ................... 707/7 |
| 2008/0301586 A1 | 12/2008 | Ayatsuka et al. |
| 2009/0303160 A1* | 12/2009 | Chew ................. G06F 17/3028 345/55 |
| 2010/0073396 A1* | 3/2010 | Wang et al. ................. 345/591 |
| 2010/0074540 A1* | 3/2010 | Tang .................. G06K 9/00677 382/225 |
| 2010/0248777 A1* | 9/2010 | Roberts et al. ............. 455/556.1 |
| 2011/0016150 A1* | 1/2011 | Engstrom et al. ............ 707/778 |
| 2011/0064317 A1* | 3/2011 | Ubillos ......................... 382/218 |
| 2011/0234613 A1* | 9/2011 | Hanson et al. ............... 345/589 |
| 2011/0235858 A1* | 9/2011 | Hanson et al. ............... 382/103 |
| 2011/0252359 A1* | 10/2011 | England ................. G06F 9/451 715/781 |
| 2011/0296317 A1* | 12/2011 | Ishihara .............. G06F 17/2211 715/753 |
| 2012/0179680 A1* | 7/2012 | Isaacson ........... G06F 17/30144 707/737 |

FOREIGN PATENT DOCUMENTS

| | | |
|---|---|---|
| JP | 5648800 | 11/2014 |
| KR | 1020110035375 | 4/2011 |
| KR | 1020120001424 | 1/2012 |

OTHER PUBLICATIONS

Mor Naaman et al., "Automatic Organization for Digital Photographs with Geographic Coordinates", Proceedings of the Fourth ACM/IEEE.
Joint Conference on Digital Libraries (2004), 10 pages.
Korean Office Action dated Jan. 10, 2019 issued in counterpart application No. 10-2012-0003084, 5 pages.

* cited by examiner

METHOD, APPARATUS, AND COMPUTER READABLE RECORDING MEDIUM FOR AUTOMATIC GROUPING AND MANAGEMENT OF CONTENT IN REAL-TIME

PRIORITY

This application claims priority under 35 U.S.C. § 119 to Korean Patent Application No. 10-2012-0003084, which was filed in the Korean Intellectual Property Office on Jan. 10, 2012, the disclosure of which is incorporated herein by reference.

BACKGROUND OF THE INVENTION

1. Field of the Invention

The present invention relates generally to a method and apparatus for managing received or generated content, and a computer readable recording medium having recorded thereon a program for executing the method.

2. Description of the Related Art

With development of memory integration technology and an increase in storage capacity of devices, such as smart phones or tablet Personal Computers (PCs), the amount of received or generated content stored in these devices is also increasing.

Accordingly, in order to easily locate the content stored in these devices, the received and generated content needs to be efficiently grouped and managed. However, it is very inconvenient for a user to group the received or generated content on a one by one basis.

SUMMARY OF THE INVENTION

Accordingly, the present invention has been made to solve the problems in the related art and to provide at least the advantages described below. An aspect of the present invention provides a method and apparatus for managing content, wherein content received or generated by a device are automatically grouped and managed in real-time, and a computer readable recording medium having recorded thereon a program for executing the method.

According to an aspect of the present invention, a method of managing content includes detecting whether content is received or generated by a device, grouping the received or generated content with another received or generated content, and displaying the grouped content on the device, wherein the another content includes at least one content received or generated before the detected received or generated content.

According to another aspect of the present invention, a method executed in a computer includes, in a device including a display function detecting whether content is received or generated by a device, grouping the received or generated content with another received or generated content, and displaying the grouped content on the device, wherein the another content includes at least one content received or generated before the detected received or generated content.

According to another aspect of the present invention, an apparatus for managing content includes a storage unit for storing at least one program, a user interface unit for interacting with a user, and at least one processor for executing the at least one program, wherein the at least one program includes a command of detecting whether content is received or generated by the apparatus, grouping the received or generated content with another received or generated content, and displaying the grouped content on the user interface unit, wherein the another content includes at least one content received or generated before the detected received or generated content.

According to another aspect of the present invention, a computer readable recording medium having recorded thereon a program for executing a method for managing content, the method including a storage unit for storing at least one program, a user interface unit for interacting with a user, and at least one processor for executing the at least one program, wherein the at least one program includes a command of detecting whether content is received or generated by the apparatus, grouping the received or generated content with another received or generated content, and displaying the grouped content on the user interface unit, wherein the another content includes at least one content received or generated before the detected received or generated content.

According to another aspect of the present invention, a computer readable recording medium having recorded thereon a program for executing in a computer a method for managing content, the method including detecting whether content is received or generated by a device, grouping the received or generated content with another received or generated content, and displaying the grouped content on the device, wherein the another content includes at least one content received or generated before the detected received or generated content.

BRIEF DESCRIPTION OF THE DRAWINGS

The above and other aspects, features and advantages of the present invention will be more apparent from the following detailed description taken in conjunction with the accompanying drawings in which.

DETAILED DESCRIPTION OF EMBODIMENTS OF THE PRESENT INVENTION

Hereinafter, the present invention is described in detail by describing various embodiments of the present invention with reference to accompanying drawings in which aspects of the present invention are illustrated. In this description, detailed explanations of known techniques and elements are omitted to avoid obscuring the subject matter of the present invention. Further, when referring to various elements, the terms first and second are used to distinguish one element from another element. Additionally, same or like reference numbers are used throughout the drawings to refer to the same or like components.

Figure 1:
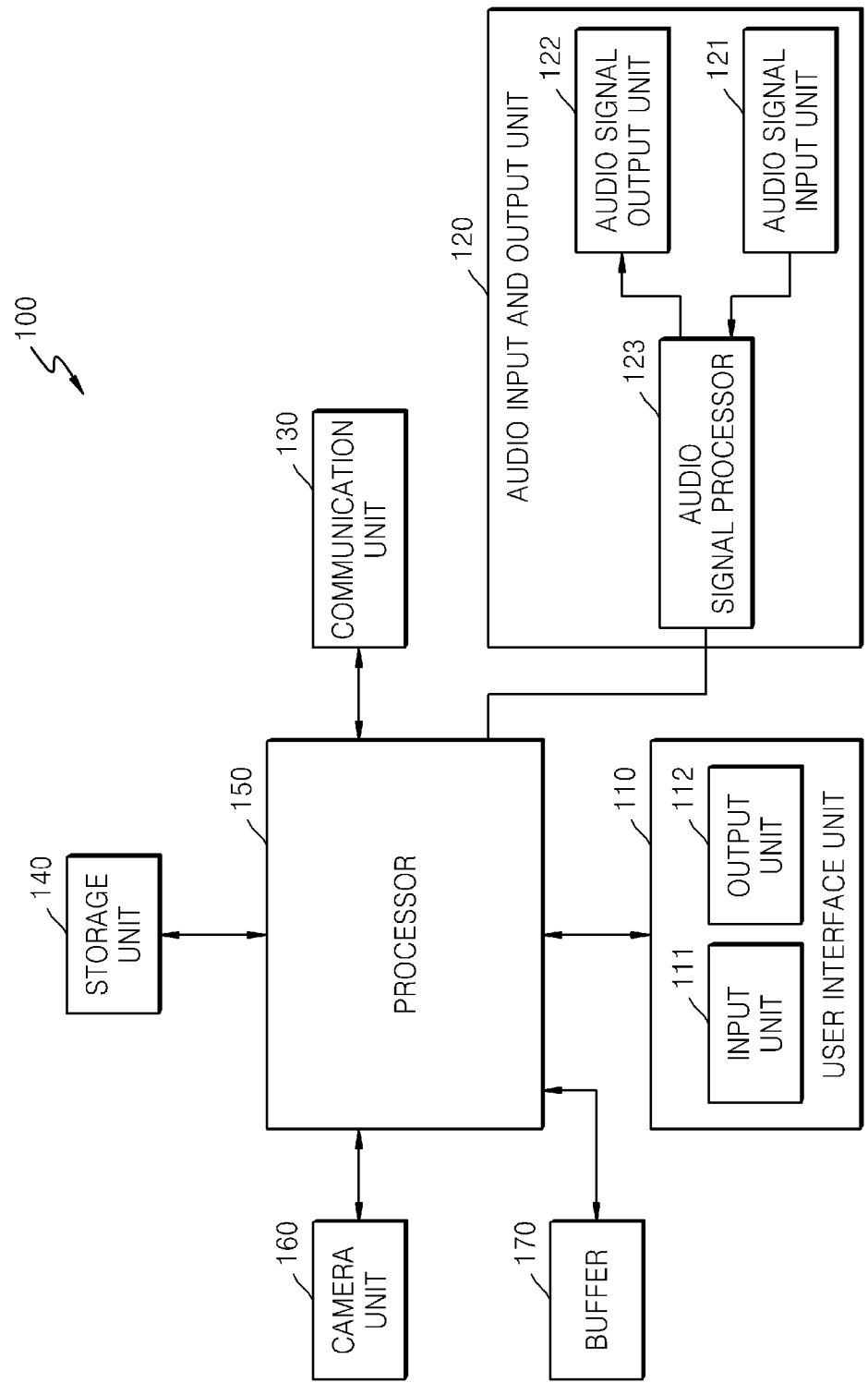
FIG. 1 is a block diagram illustrating an apparatus for managing content, according to an embodiment of the present invention.

FIG. 1 is a block diagram illustrating an apparatus 100 for managing content, according to an embodiment of the present invention. Examples of the apparatus 100 of FIG. 1 include a smart phone, a Smart Television (TV), a Personal Computer (PC), a desktop PC, a notebook, a smart board, a tablet PC, a slate PC, a digital photo frame, a mobile device, a handheld computer, a media player, and a Personal Digital Assistant (PDA), but are not limited thereto.

Referring to FIG. 1, the apparatus 100 includes a user interface unit 110, an audio input and output unit 120, a communication unit 130, a storage unit 140, a processor 150, a camera unit 160, and a buffer 170.

The user interface unit 110 allows interaction or provides an interface between a user and the apparatus 100, and is referred to as a user interface. The user interface unit 110 includes an input unit 111 for receiving an input signal and an output unit 112 for outputting an output signal. The input and output units 111 and 112 are configured as independent units. The user inputs information, a command, an instruction, or data by using the input unit 111. A transmitted signal from the input unit 111 to the processor 150 is referred to as input information, an input command, an input instruction, or input data.

The input unit 111 is configured based on a touch interface using a touch panel or a touch screen. When the input unit 111 is configured based on the touch interface, the input unit 111 and the output unit 112 may have a combined structure. When the input and output units 111 and 112 have the combined structure based on the touch interface, the input unit 111 transmits a signal obtained by sensing at least one of a touch motion and a touch strength of the user on a screen displayed on the output unit 112, as an input signal, to the processor 150. The touch motion of the user includes a number of various touch inputs. In order to transmit the signal obtained by sensing at least one of the touch motion and the touch strength of the user to the processor 150, the input unit 111 includes a touch sensor (not shown). The input unit 111 includes the touch interface, and at least one of a physical button, a switch, and a stick.

Examples of the input signal received through the input unit 111 include a request signal for content reception or generation, a request signal for grouped content editing, and a request signal based on menu items provided through the output unit 112 by controlling the menu button, menu items and selection items provided through the output unit 112 according to operations of the apparatus 100. The request signal for content reception or generation includes a signal according to shutter control in the camera unit 160.

Examples of the output unit 112 include a Liquid Crystal Display (LCD), a Thin Film Transistor-Liquid Crystal Display (TFT-LCD), an Organic Light-Emitting Diode (OLED), a flexible display, a 3 Dimensional (3D) display, and an Active-Matrix Organic Light-Emitting Diode (AMO-LED), but are not limited thereto. Thus, the output unit 112 is referred to as a display function unit or a display.

The audio input and output unit 120 provides an audio interface between the user and the apparatus. The audio input and output unit 120 includes an audio signal input unit 121 for receiving an audio signal, such as a microphone, an audio signal output unit 122 for outputting an audio signal, such as a speaker, and an audio signal processor 123.

The audio signal input unit 121 converts a received audio signal to an electrical signal, and transmits the electrical signal to the audio signal processor 123. The audio signal processor 123 converts the electrical signal received from the audio signal input unit 121 to audio data, and transmits the audio data to the processor 150. The processor 150 stores the audio data received from the audio signal processor 123 in the storage unit 140, or externally outputs the audio data through the communication unit 130. The storage unit 140 stores the audio data in a file format.

The processor 150 transmits the audio data read from the storage unit 140 or received through the communication unit 130 to the audio signal processor 123. The audio signal processor 123 converts the audio data received from the processor 150 to an electrical signal, and transmits the electrical signal to the audio signal output unit 122. The audio signal output unit 122 converts the received electrical signal to a signal audible by the user, and outputs the signal. The audio signal input unit 121 and the audio signal output unit 122 is integrally formed like a headset.

When the processor 150 executes an application for generating an audio file as content, the apparatus 100 generates the audio file as the content by using the audio signal input unit 121 and the audio signal processor 123, but the generating of the audio file as the content is not limited thereto. When the audio file is generated as the content, the processor 150 generates metadata of the audio file. The metadata of the audio file includes, for example, at least one of time and date information regarding when the audio file is generated, and location information regarding where the audio file is generated.

The communication unit 130 transmits and receives a message or data to and from another device (not shown) via a wireless network, such as wireless internet, intranet, cellular phone network, Local Area Network (LAN), Wi-Fi, Bluetooth®, Radio Frequency IDentification (RFID), or Zigbee, or transmits and receives a message or data to and from another device via a wired network using a plug and play interface based on a Universal Serial Bus (USB) port, or a wired internet, but is not limited thereto.

Content is received from outside the apparatus 100 or another device through the communication unit 130. The content received through the communication unit 130 is referred to as multimedia content. Examples of the content include a picture, a video, a moving image file, an audio file, and a document. When the content is received, the communication unit 130 also receives the metadata of the content.

The metadata of the content is detailed information of the content as described above, and is defined according to a type of content. For example, when the content is a picture, the metadata includes time, date, and location information regarding when and where the picture was taken, and information regarding an object in the picture. When the content is a moving image file, the metadata includes a file name or a file title, date and time information regarding when the moving image file was created, location information regarding where the moving image file was created, manufacturer information of the moving image file, and information related to content of the moving image file. The information related to the content of the moving image file includes information regarding an object in the moving image file, and a keyword (or index term) or a search word for searching for the moving image file. When the content is a document, the metadata includes a document name, a document title, time and date information regarding when the document was created, writer information of the document, and a keyword (or index term) or search word related to content of the document.

The camera unit 160 may not be included in the apparatus 100 depending on the type of apparatus. For example, when the apparatus 100 is a media player, the apparatus 100 does not include the camera unit 160. However, when the apparatus 100 is a smart phone, the apparatus 100 includes the camera unit 160. The camera unit 160 includes at least one camera. The apparatus 100 generates at least one content by using a photographing function of the camera unit 160. The content generated by using the camera unit 160 includes a picture, a video, or a moving image file, but is not limited thereto. The content generated by the camera unit 160 is referred to as multimedia content.

When the content is generated, the camera unit 160 generates the metadata of the content at the same time. Alternatively, the processor 150 generates the metadata when the camera unit 160 generates the content. When the content is a picture, the metadata includes time and date information regarding when the picture was taken, location information regarding where the picture was taken, object information in the picture, and information related to the object in the picture. When the content is a moving image file, the metadata includes time and date information regarding when the moving image file was created, location information regarding where the moving image file was created, manufacturer information of the moving image file, and information related to content of the moving image file. The information related to the content of the moving image file includes information regarding an object in the moving image file. When the content is a video, the metadata includes the information described above with reference to the picture. However, the metadata of the content is not limited thereto.

The metadata of the content generated by using the camera unit 160 and the audio input and output unit 120 and the metadata of the content received through the communication unit 130 includes the same or different information. For example, when metadata of a picture generated by the camera unit 160 includes the time, the date, and the location information of the picture, and metadata of a picture received through the communication unit 130 includes the time, the date, and the location information of the picture, the content generated by the camera unit 160 and the content received through the communication unit 130 include the same information. Of course, the time, the date, and the location information of the picture generated by the camera unit 160 and the time, the date, and the location information of the picture received through the communication unit 130 substantially have different values. When the metadata of the picture generated by the camera unit 160 includes time and date information, and the metadata of the picture received through the communication unit 130 includes time, date, and location information, the metadata of the content generated by the camera unit 160 and the metadata of the content received through the communication unit 130 include different information.

Figure 8:
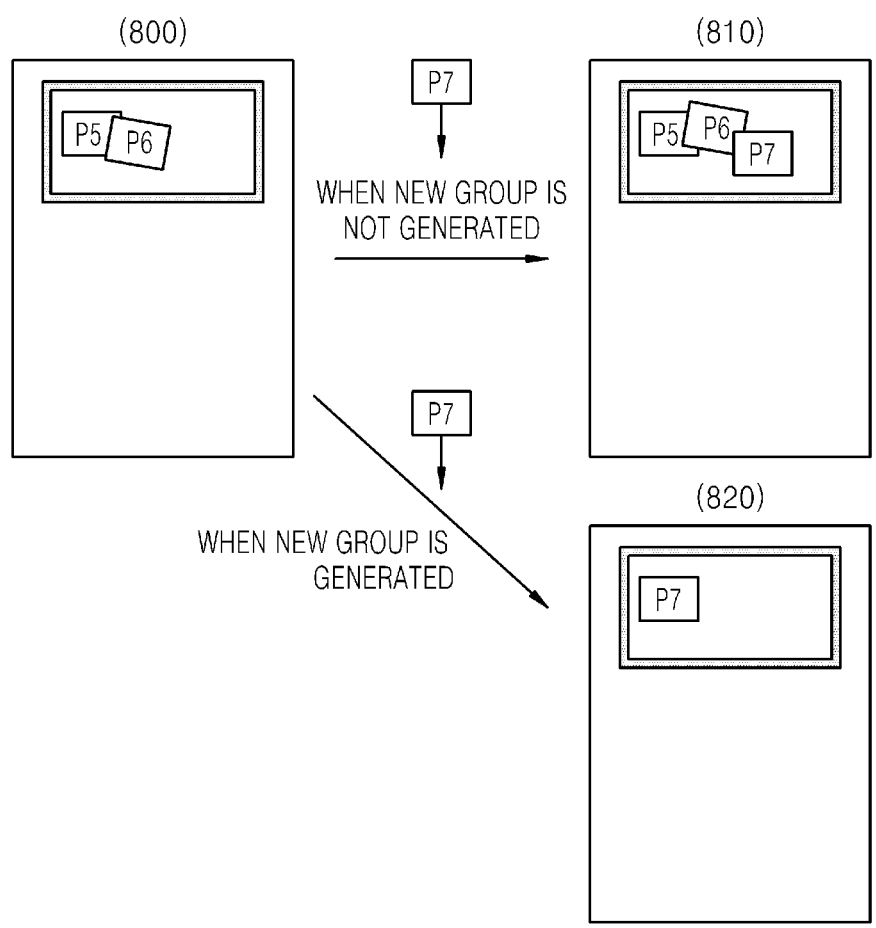
FIG. 8 is a diagram illustrating displaying of only recently grouped content, according to an embodiment of the present invention.

The buffer 170 temporarily stores the content received or generated by the apparatus 100 for grouping, and is a first-in, first-out buffer. The buffer 170 stores content corresponding to an image regarding grouped content output to the output unit 112 as illustrated in FIGS. 5, 10, 12-15, and 17, or content corresponding to an image regarding temporarily grouped content that are not completely grouped as illustrated in FIG. 8.

A temporary group is a group that is generated last because when a new group is generated by newly generated or received content, a group generated immediately before is considered as a group that completed grouping. When a temporary group is processed as a group that completed grouping, content included in the group that completed grouping is output from the buffer 170. The buffer 170 is formed separately from the processor 150 as illustrated in FIG. 1, or formed as a single chip with the processor 150.

The storage unit 140 is non-volatile memory, such as a high speed random access memory, a magnetic disk storage device, or a flash memory, or a non-volatile semiconductor memory. The storage unit 140 stores at least one program and a resource for executing a method of managing content according to embodiments of the present invention. The resource includes information required to group a received or generated content. For example, when the received or generated content is grouped based on time information, the resource includes time information as a grouping standard. When the received or generated content is grouped based on location information, the resource includes geographical information as a grouping standard. The geographical information includes a location name and distance information. Accordingly, content generated within a predetermined distance based on locations where the content is generated is grouped into one group by using geographical information.

The storage unit 140 stores separate reference information according to grouping units. For example, the storage unit 140 separately stores reference information required to group the received or generated content in real-time, and reference information required to group generated content for a longer time. For example, if grouping generated content in real-time is called segmentation and grouping generated content for a longer time is called clustering, the storage unit 140 may separately store reference information required to segment the content and reference information required to cluster the content, and the processor 150 uses the reference information according to grouping circumstances. The grouping is performed in event units. An event unit is defined according to location and time information, but is not limited thereto.

The storage unit 140 stores grouped content so that it is searched for in group units. In order to search for the grouped content stored in the storage unit 140 in group units, identification information or tag information set according to group units is used.

The storage unit 140 includes a first storage unit (not shown) for storing the program and the resource required for grouping, and a second storage unit (not shown) for storing the grouped content.

The processor 150 controls overall functions of the apparatus 100. The processor 150 is referred to as at least one processor because, although the processor 150 of FIG. 1 is illustrated as a single chip, the processor 150 is divided into a plurality of processors according to functions of the apparatus 100.

The processor 150 is referred to as a controller, a microprocessor, or a digital signal processor. The processor 150 operates based on an application for executing a method of managing content. A program for executing the application for executing the method is read from the storage unit 140 or downloaded from an app store server (not shown) connected through the communication unit 130.

Figure 2:
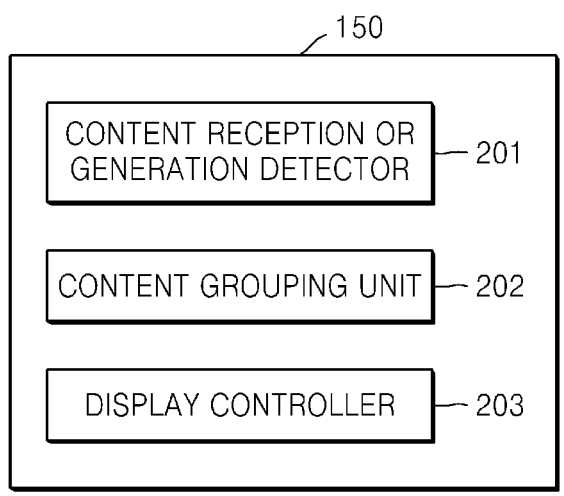
FIG. 2 is a block diagram illustrating a processor of FIG. 1, according to an embodiment of the present invention.

The processor 150 includes elements illustrated in FIG. 2. FIG. 2 is a detailed functional block diagram illustrating the processor 150 of FIG. 1, according to an embodiment of the present invention. Referring to FIG. 2, the processor 150 includes a content reception or generation detector 201, a content grouping unit 202, and a display controller 203.

The content reception or generation detector 201 detects whether content is generated according to control operations on the camera unit 160 and the audio input and output unit 120, or whether content is received according to control operations on the communication unit 130 or process operations of the processor 150 on content received through the communication unit 130, but a method of detecting content reception or generation is not limited thereto.

The detecting of whether the content is generated according to the control operations of the camera unit 160 depends on whether a shutter of the camera unit 160 is controlled. That is, when the shutter of the camera unit 160 is controlled, it is detected that the content is generated by the camera unit 160, and when the shutter of the camera unit 160 is not controlled, it is detected that the content is not generated by the camera unit 160.

Also, detecting whether the content is generated according to the control operations of the audio input and output unit 120 depends on whether an audio recording application is executed in the processor 150 and an audio recording completion is controlled in the processor 150. That is, audio content is generation is detected by using the audio input and output unit 120 if the audio recording application is executed and the audio recording completion is controlled.

Detecting whether the content is received through the communication unit 130 depends on whether an application related to content reception is executed in the processor 150 or based on a response of the user regarding outputting of a content reception notification message. That is, content receipt is detected through the communication unit 130 if the user checks the content regarding the content reception notification message and determines to receive the content.

The content reception or generation detector 201 is referred to as a content reception or generation determiner since the content reception or generation detector 201 determines reception or generation of content.

The content grouping unit 202 groups the received or generated content. The grouping is described in detail below with reference to FIGS. 4, 6, and 7. The display controller 203 controls an image of the content grouped by the content grouping unit 202 to be displayed on the output unit 112 as illustrated in FIGS. 5, 8, 10, 12-15, and 17.

Figure 3:
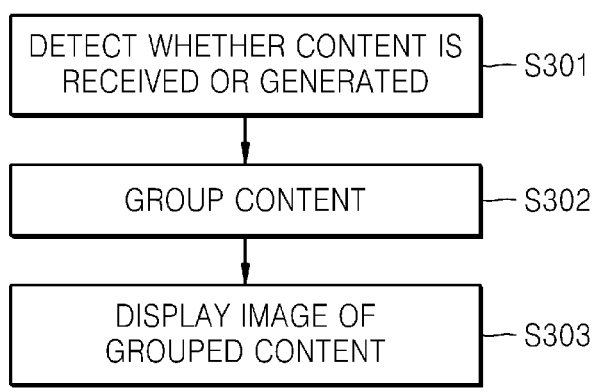
FIG. 3 is a flowchart illustrating a method of managing content, according to an embodiment of the present invention.

FIG. 3 is a flowchart illustrating a method of managing content, according to an embodiment of the present invention. The processor 150 of FIG. 1 operates according to the method of FIG. 3.

Referring to FIG. 3, the processor 150 detects whether content is received or generated by the apparatus 100 in Step 301. Step 301 is performed as described above with reference to FIG. 1 and the content reception or generation detector 201 of FIG. 2.

As one content is received or generated, the processor 150 groups the content in Step 302. When the content is received but metadata of the content is not received, a reception point in time and/or a received location is used as metadata for grouping the content. However, if the metadata is received, the received metadata is used to group the content. Hereinafter, grouping of the content is described regardless of whether the metadata is received, wherein the content is grouped by using the metadata, as described above. That is, time or location information of the content corresponds to time or location information included in the metadata if the metadata is received, or alternatively, corresponds to time or location information at a reception point in time if the metadata is not received. The grouping of the received or generated content is performed by using reference information stored in the storage unit 140.

Figure 4:
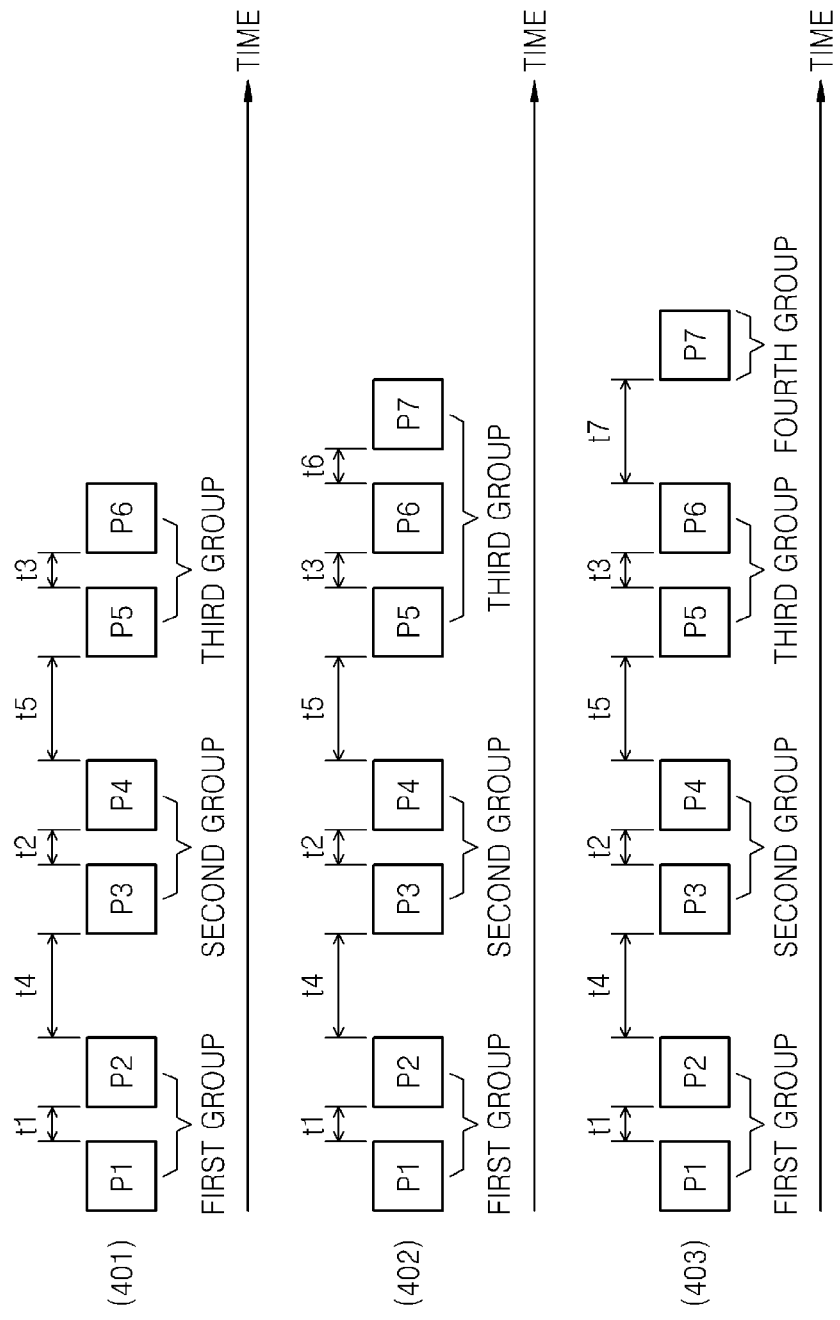
FIG. 4 is a diagram illustrating grouping of content based on time information, according to an embodiment of the present invention.

FIG. 4 is a diagram illustrating grouping of a picture received or generated by the apparatus 100 based on time, according to an embodiment of the present invention. A case 401 shows pictures already grouped by using a reference time t, wherein P1 and P2 are grouped into one group (first group), P3 and P4 are grouped into one group (second group), and 5 and 6 are grouped into one group (third group). Here, times t4 and t5 have a value equal to or over the reference time t stored in the storage unit 140, and times t1 through t3 do not have a value equal to or over the reference time t. For example, if the reference time t is 10 minutes, the times t1 through t3 is equal to or under 9 minutes, and the times t4 and t5 is equal to or over 10 minutes.

Whenever new content is received or generated, the processor 150 performs the grouping of the content in Step 302, and displays an image of the grouped content on the output unit 112 in Step 303.

Figure 5:
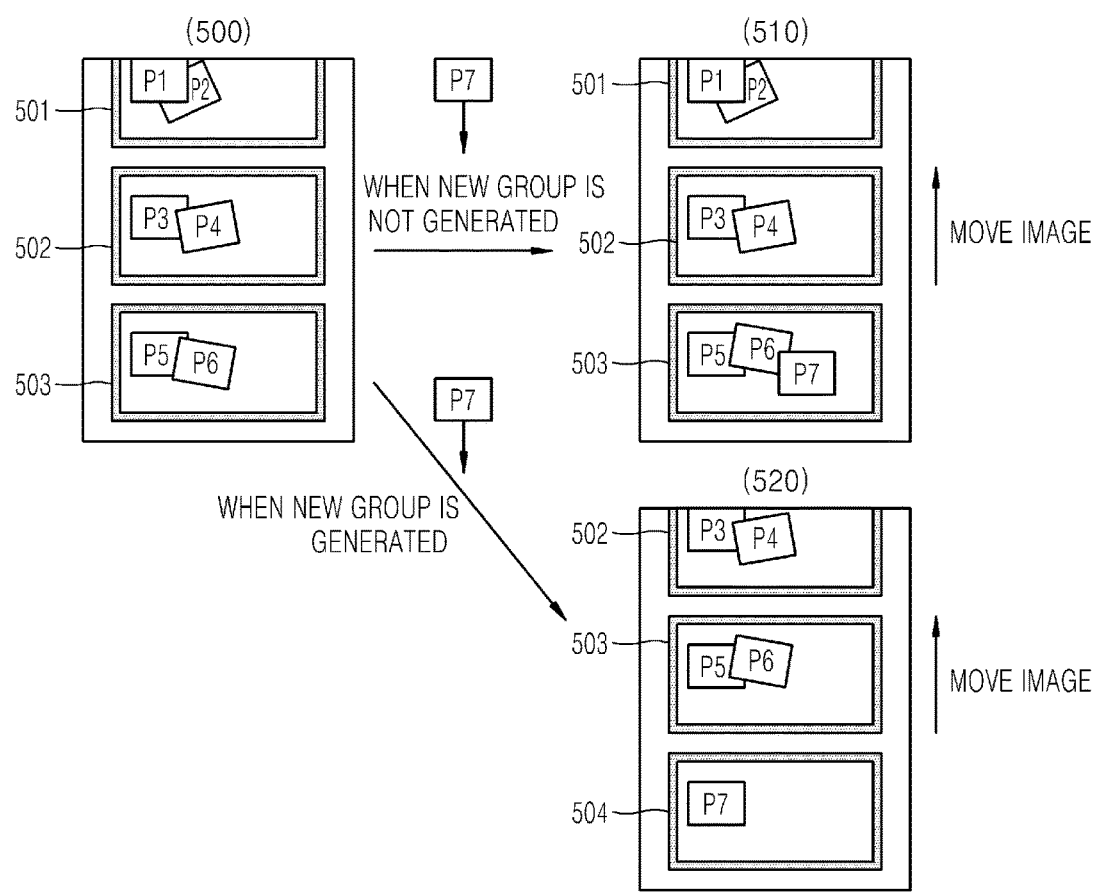
FIG. 5 is a diagram illustrating displaying of grouped content according to an embodiment of the present invention.

For example, as the received or generated content is grouped as illustrated by case 401, a screen 500 of the grouped content of FIG. 5 is displayed on the output unit 112. FIG. 5 is a diagram illustrating displaying of grouped content according to an embodiment of the present invention, wherein information regarding content included in one group is displayed on one template. In FIG. 5, P1 and P2 displayed on a first group template 501 is information regarding content included in a first group. If the received or generated content is a picture, P1 and P2 include reduced images of the received or generated pictures. The grouped content is displayed if the reduced images of the received or generated pictures are displayed on the first group template 501. Here, information regarding P1 and P2 displayed on the first group template 501 includes an image based on identification information of the received or generated content. The identification information is based on the metadata described above, and the image includes a text, a thumbnail, or an icon.

P3 and P4 displayed on a second group template 502 of FIG. 5 are similar to P1 and P2 described above. P5 and P6 displayed on a third group template 503 of FIG. 5 are similar to P1 and P2 described above. Although not shown, if the content received or generated in Step 301 is P1 constituting content received or generated first, the grouped content displayed on the output unit 112 only includes P1 in a first group. Templates are selected by the user.

When the content grouped as illustrated in the case 401 of FIG. 4 are displayed on the output unit 112 as illustrated by screen 500 of FIG. 5 and P7 constituting new content is received or generated, wherein a difference between a time when P7 is generated and a time when P6 is generated is t6, i.e., smaller than the reference time t as illustrated by case 402 of FIG. 4, the processor 150 groups P7 in the same group (third group) as P5 and P6 in Step 302 of FIG. 3, as illustrated by case 402 of FIG. 4. When the grouping is performed as such, the screen 500 displayed on the output unit 112 is updated to a screen 510, wherein information regarding P7 is included in the third group template 503.

When the content grouped as illustrated in the case 401 of FIG. 4 are displayed on the output unit 112 as illustrated by screen 500 of FIG. 5, and P7 constituting new content is received or generated, wherein a difference between a time when P7 is generated and a time when P6 is generated is t7, i.e., higher than the reference time t as illustrated by case 403 of FIG. 4, the processor 150 groups P7 in a new group (fourth group) in Step 302 of FIG. 3, as illustrated by case 403 of FIG. 4. When the grouping is performed as such, the screen 500 displayed on the output unit 112 is updated to a screen 520, wherein information regarding P7 is updated in a fourth group template 504. As the fourth group is newly generated, images regarding group content displayed on the output unit 112 are moved according to a first-in, first-out order, and thus the image of the grouped content in the first group is not displayed. Referring to FIG. 5, the images regarding the group content move upward, but alternatively, the images may move downward, to the left, or to the right.

Figure 6:
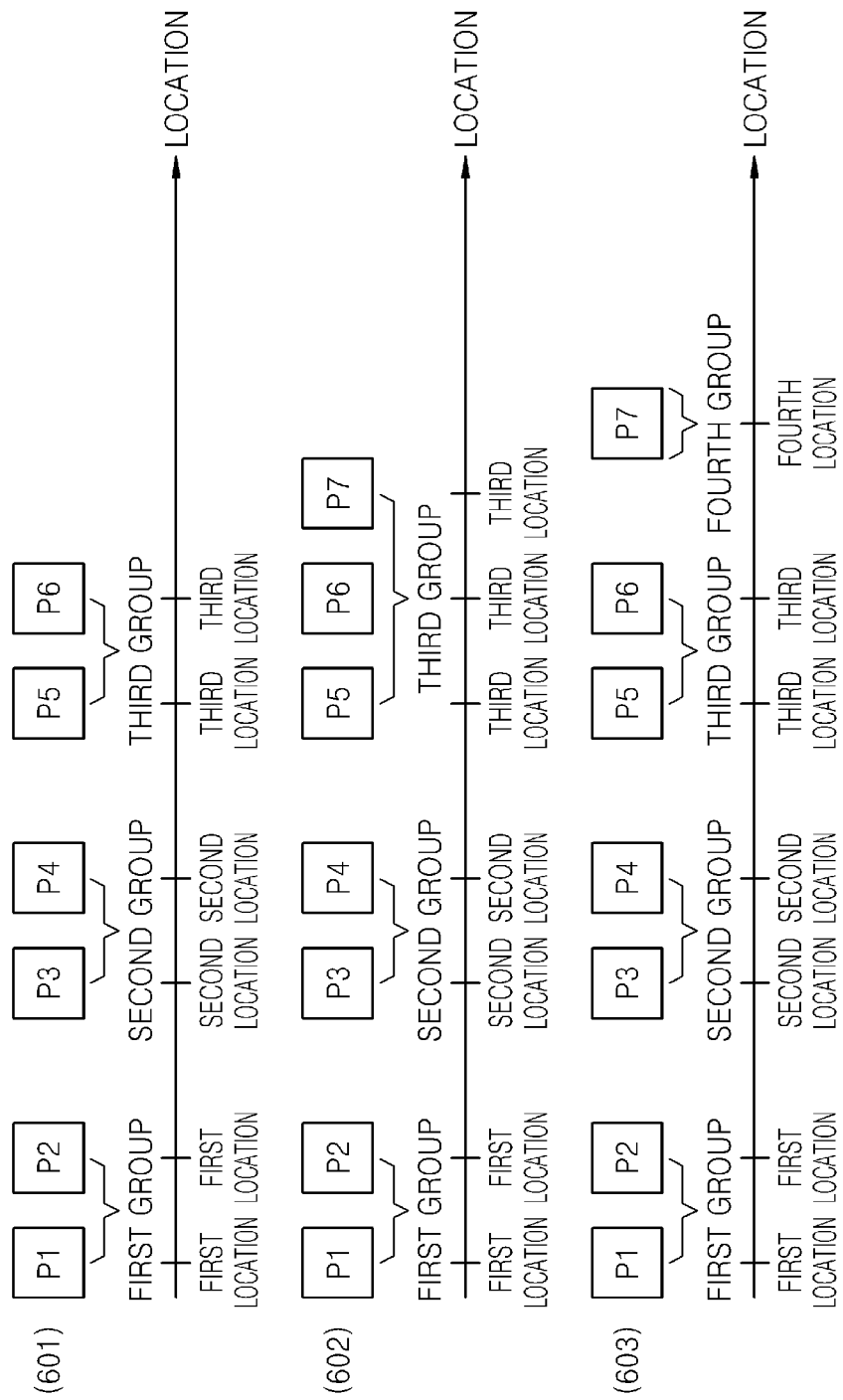
FIG. 6 is a diagram illustrating grouping of content based on location information, according to an embodiment of the present invention.

FIG. 6 is a diagram illustrating grouping of content using location information as a grouping standard, according to an embodiment of the present invention. In a case 601 of FIG. 6, P1 and P2 are content received or generated at a first location, P3 and P4 are content received or generated at a second location, and P5 and P6 are content received or generated at a third location. As such, when P7 constituting new content is received or generated while content is being grouped, and P7 is received or generated at the third location identical or similar to P6, the processor 150 does not generate a new group and P7 is included in the third group to be displayed on the output unit 112 as illustrated by screen 510 of FIG. 5.

However, as illustrated by case 603 of FIG. 6, if P7 is generated or received at a fourth location that is different from P6, a new group (fourth group) is generated, and a screen displayed on the output unit 112 is similar to the screen 520 of FIG. 5.

Figure 7:
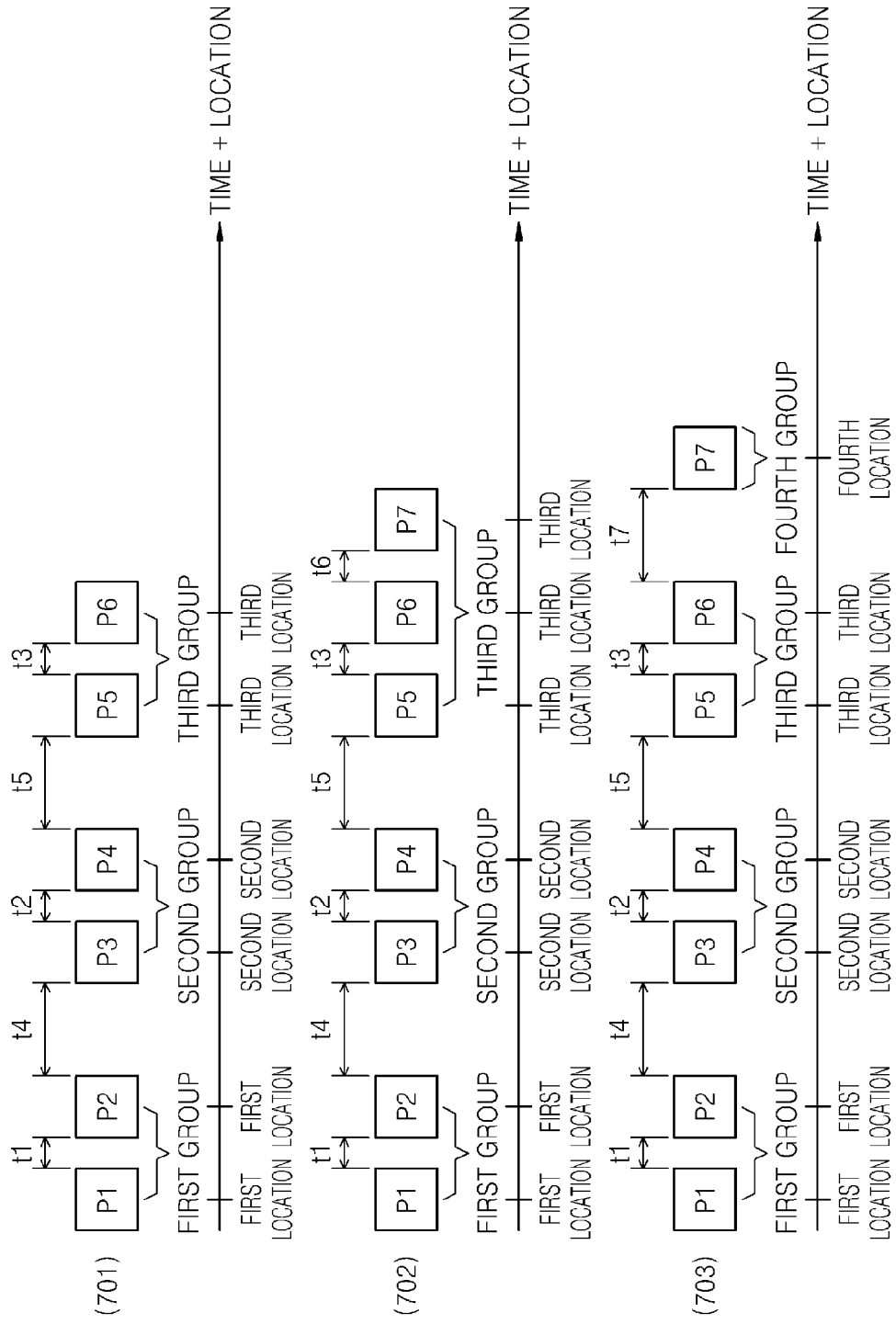
FIG. 7 is a diagram illustrating grouping of content based on time information and location information, according to an embodiment of the present invention.

FIG. 7 is a diagram illustrating grouping of content by using both time information and location information as a grouping standard, according to an embodiment of the present invention. After content is grouped by using the time and location information as illustrated by case 701 of FIG. 7, new content P7 is grouped in a third group as illustrated by case 702 of FIG. 7 as P7 is received or generated at a third location identical to previously received or generated content P6 during a time t6 that is smaller than the reference time t, or grouped in a new group, i.e., a fourth group, as illustrated by case 703. As illustrated by case 703, a time t7 is equal to or over the reference time t, and a location is a fourth location that is different from a previous location, but alternatively, when location information is the third location and time information is the time t7, P7 is grouped in the new group as illustrated by case 703 or grouped to be included in the third group. Alternatively, when the time information is a time t6 and the location information is the fourth location, P7 is grouped in the new group as illustrated by case 703 or grouped in the third group as illustrated by case 702. Such grouping conditions are determined based on reference information set in the storage unit 140.

The grouped content displayed on the output unit 112 display a plurality of groups as illustrated in FIG. 5, or display only recently grouped content as illustrated by screen 800 of FIG. 8. A screen 810 of FIG. 8 shows a display example of that the newly received or generated content P7 is included in the third group, and a screen 820 of FIG. 8 shows a display example of that P7 is included in the fourth group.

Figure 9:
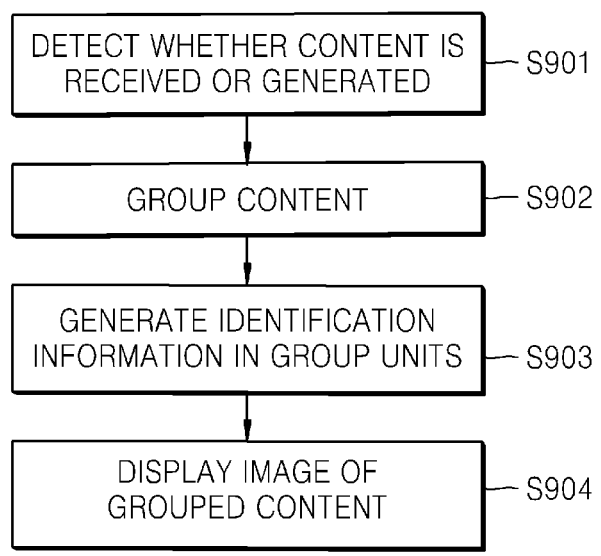
FIG. 9 is a flowchart illustrating a method of managing content, according to an embodiment of the present invention.

FIG. 9 is a flowchart illustrating a method of managing content, according to an embodiment of the present invention. In FIG. 9, identification information is generated according to group units, and the generated identification information is displayed with grouped content. Steps 901 and 902 of FIG. 9 are identical to Steps 301 and 302 of FIG. 3, as described herein.

After a new group is generated for newly received or generated content in Step 902, the processor 150 generates identification information in group units in Step 903. The identification information in group units is generated based on at least one of time (including date) and/or location information constituting reference information used during grouping or identification information of the grouped content. That is, if the identification information in group units is generated according to time information, time information of content that is received or generated first from among the grouped content, or time information of the content that are received or generated first and received or generated last is used. When the location information is used, the identification information in group units is generated by using location information, such as the first through third locations illustrated in FIGS. 6 and 7. When the identification information in group units is generated by using the identification information of each content included in the grouped content, object information of each content included in the grouped content or metadata of each content included the grouped content is used.

Figure 10:
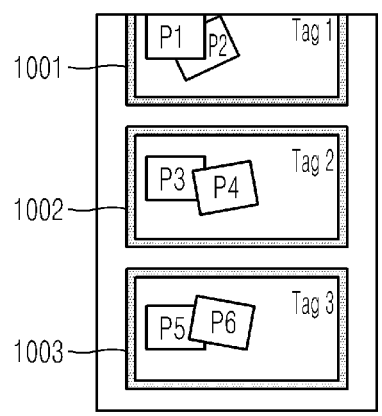
FIG. 10 is a diagram illustrating displaying of grouped content according to an embodiment of the present invention.

As such, when the identification information in group units is generated, the processor 150 displays an image of the grouped content including the generated identification information on the output unit 112 in Step 904. Accordingly, the screen 500 of FIG. 5 is displayed including identification information Tag1 through Tag3 of each group as illustrated in FIG. 10. FIG. 10 is a diagram illustrating displaying of grouped content according to an embodiment of the present invention.

Figure 11:
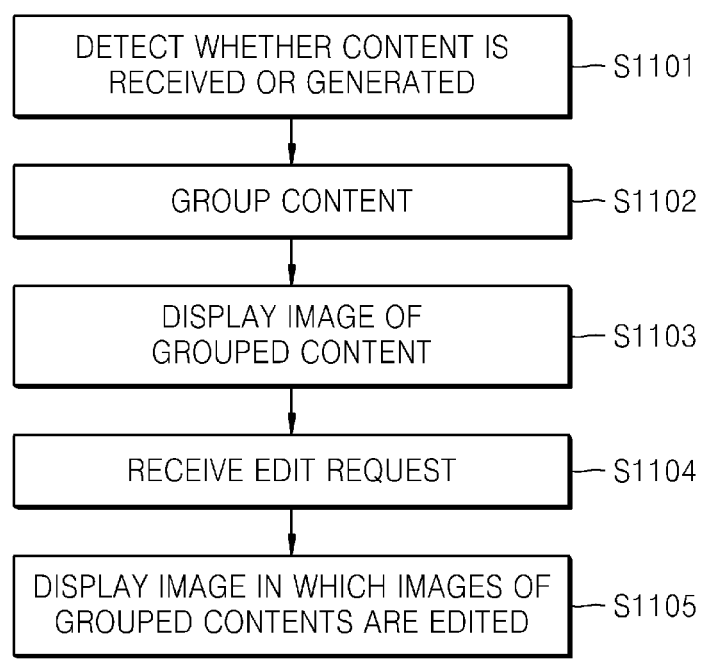
FIG. 11 is a flowchart illustrating a method of managing content, according to an embodiment of the present invention.

FIG. 11 is a flowchart illustrating a method of managing content, according to an embodiment of the present invention. The method of FIG. 11 further includes editing of displayed grouped content according to an edit request regarding the grouped content to the method of FIG. 3. Accordingly, Steps 1101 through 1103 of FIG. 11 are identical to Steps 301 through 303 of FIG. 3, described herein.

Figure 12:
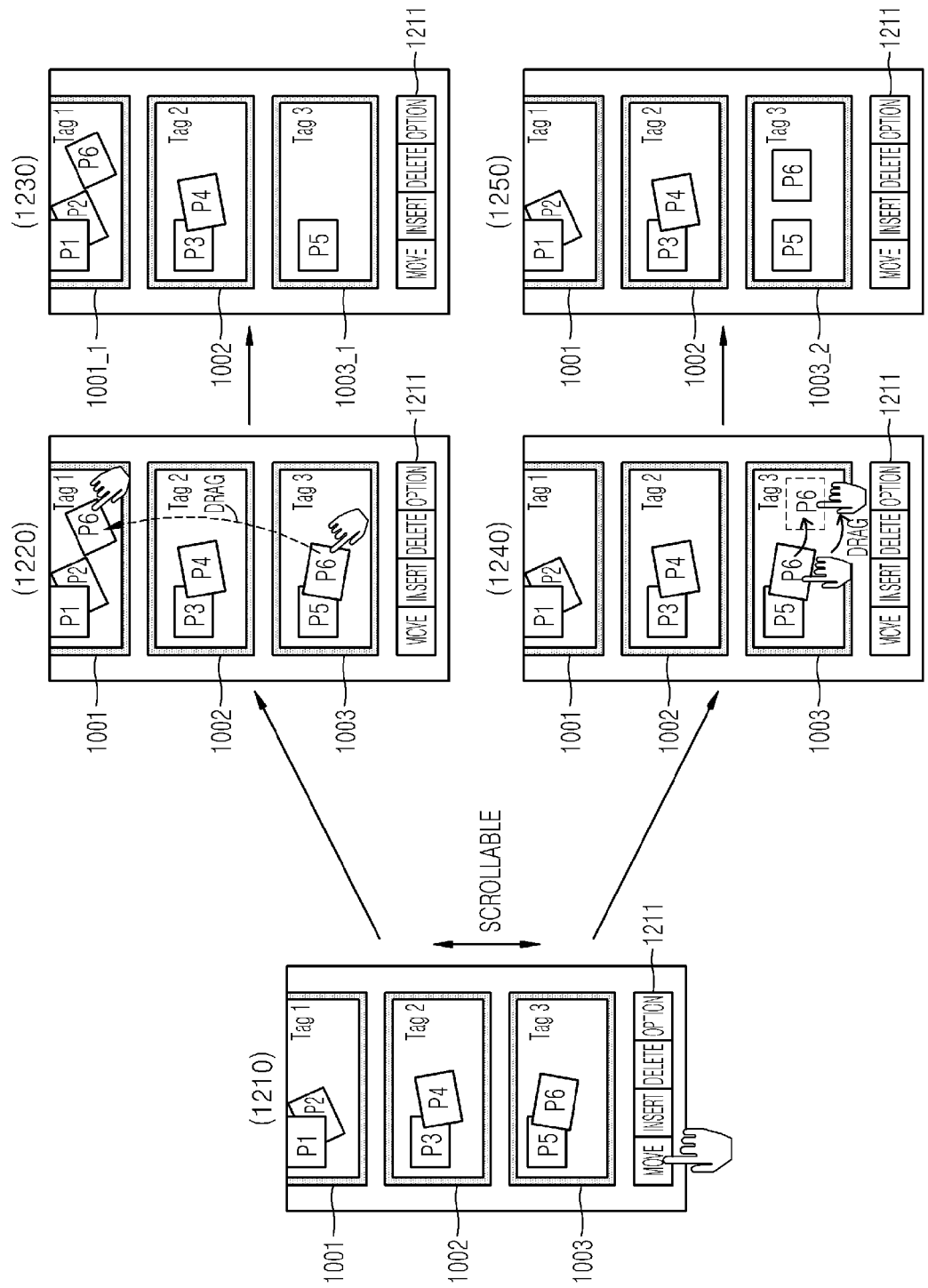
FIG. 12 is a diagram illustrating displaying of grouped content according to an embodiment of the present invention.

The edit request regarding the grouped content is performed based on menu items for requesting editing of the grouped content, as illustrated by menu bar 1211 in a screen 1210 of FIG. 12, according to menu button control through the input unit 111. FIG. 12 is a diagram illustrating displaying of grouped content according to an embodiment of the present invention, wherein the grouped content is edited.

The menu items for requesting editing are not limited to the menu bar 1211 of FIG. 12. When a selection operation of the user on displayed menu items, such as the menu bar 1211, is sensed, the processor 150 receives the edit request in Step 1104. Here, an image of the grouped content is scrolled to move a display location.

When the user selects a move item in the screen 1210, touches P6 included in a third group 1003 as illustrated by screen 1220, and drags P6 to a first group 1001, the screen 1210 displayed on the output unit 112 is changed to a screen 1230 in which images of the grouped content is edited, in Step 1105.

The move item is used to move content to another group, but as illustrated by screen 1240, the move item may also be used to move a display location of content in the same group, i.e., the third group 1003. When P6 in the third group 1003 is touched and dragged within the third group 1003 to move a display location, the screen 1210 displayed on the output unit 112 is changed to a screen 1250 including an edited third group 1003_2. An edited image is referred to as a changed image.

Figure 13:
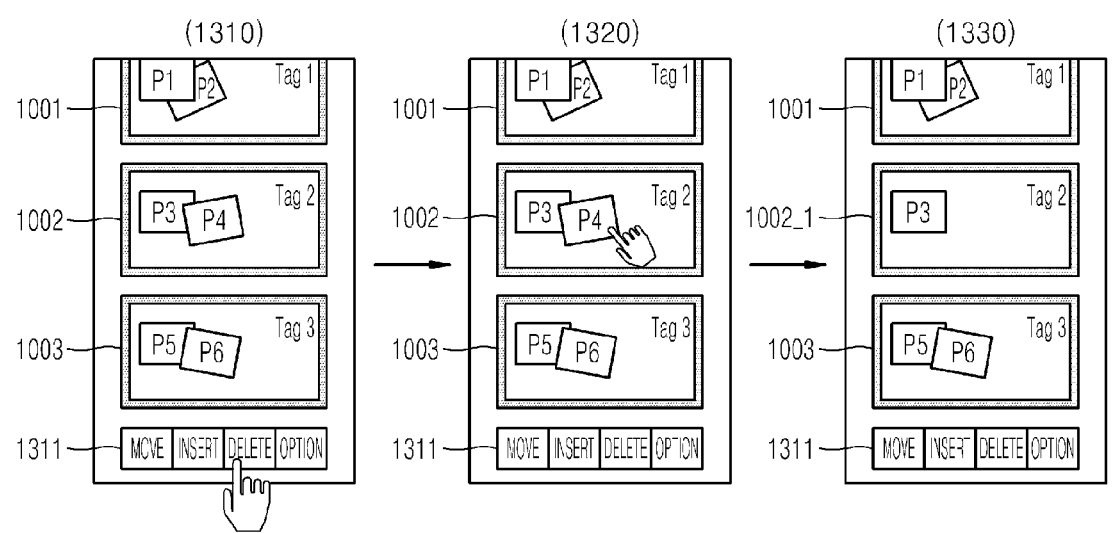
FIG. 13 is a diagram illustrating displaying of grouped content according to an embodiment of the present invention.

FIG. 13 is a diagram illustrating displaying of grouped content according to an embodiment of the present invention, wherein content the user desires is deleted. When the user touches a delete item from a menu bar 1311 displayed on a screen 1310 displayed on the output unit 112, and then touches content P4 to be deleted as illustrated by screen 1320, edited grouped content from which P4 is deleted are displayed as illustrated by screen 1330.

Figure 14:
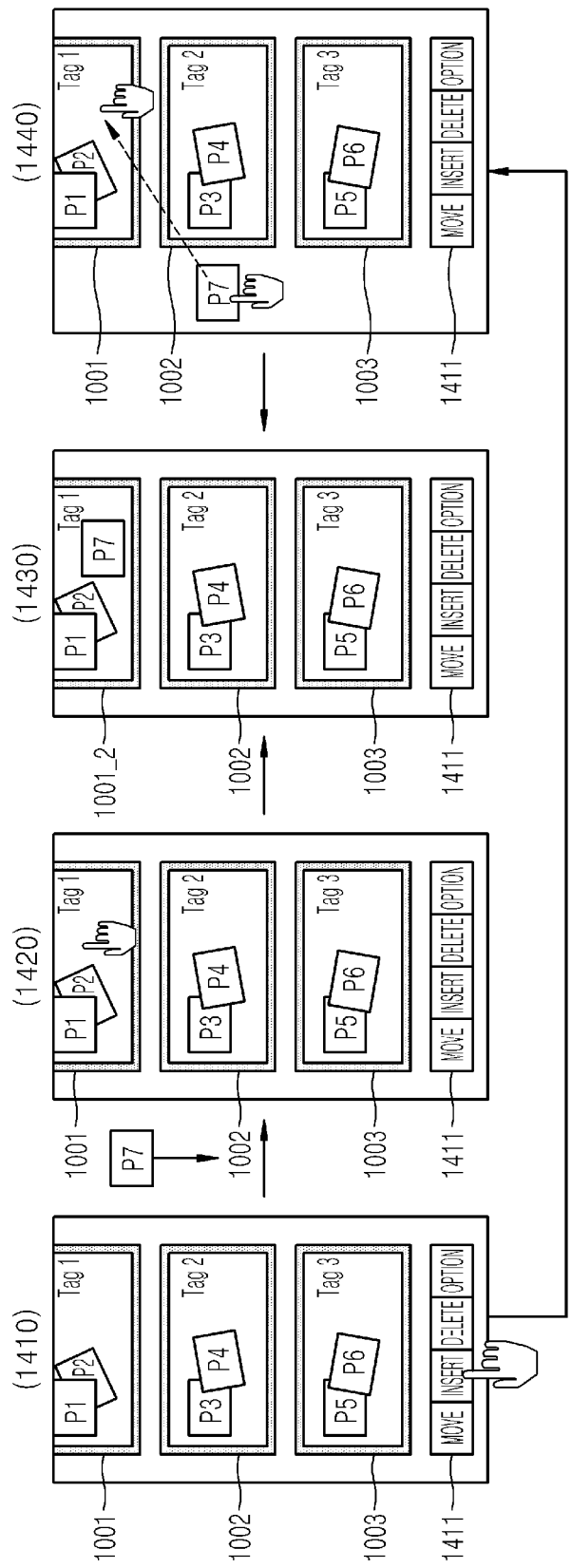
FIG. 14 is a diagram illustrating displaying of grouped content according to an embodiment of the present invention.

FIG. 14 is a diagram illustrating displaying of grouped content according to an embodiment of the present invention, wherein the newly received or generated content P7 is inserted into a desired group. In FIG. 14, the user touches an insert item from a menu bar 1411 displayed on a screen 1410 displayed on the output unit 112, before P7 is grouped. When P7 is received or generated, and the user touches the first group 1001 to insert P7 as illustrated by screen 1420, the first group 1001 is updated to a first group 1001_2 into which P7 is inserted, as illustrated by screen 1430.

Alternatively, the user may touch the insert item from the menu bar 1411 as illustrated by screen 1410, and then when P7 is received or generated, a screen 1440 is displayed on the output unit 112 so as to drag P7 to the desired group (the first group 1001) to be included in the desired group (the first group 1001), thereby displaying the screen 1430 on the output unit 112.

Figure 15:
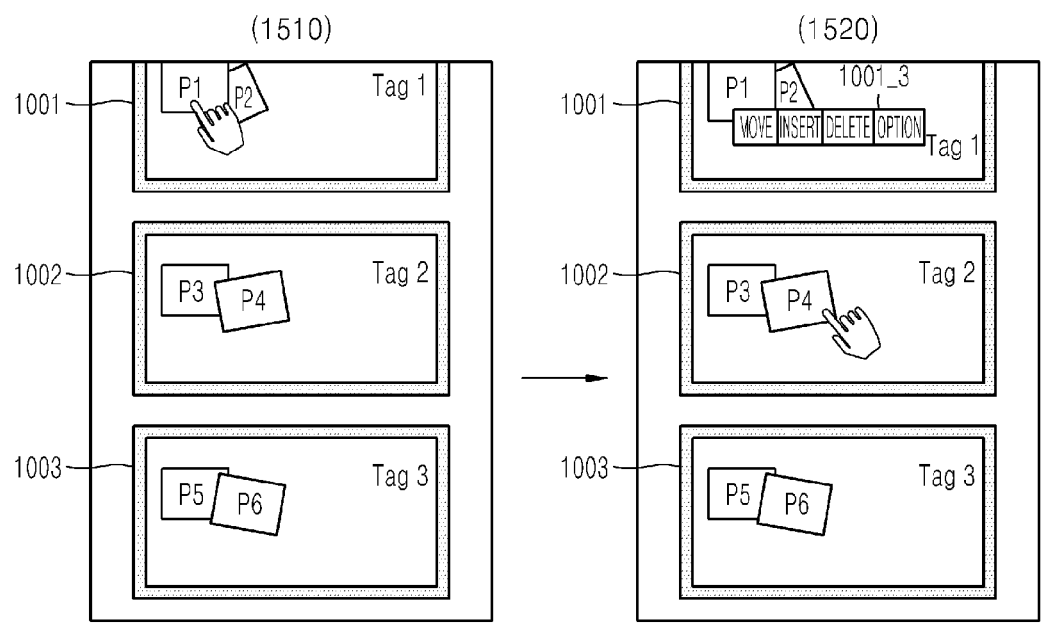
FIG. 15 is a diagram illustrating displaying of an editing item that is editable in a display image of grouped content, according to an embodiment of the present invention.

FIG. 15 is a diagram illustrating displaying of an editing item that is editable in a display image of grouped content, according to an embodiment of the present invention. When the user touches content to be edited as illustrated by screen 1510 after editing is requested via a menu button, information of the editing item capable of selecting is displayed as a menu bar 1001_3 in a popup menu format near an area where the touched content is displayed. The menu bar 1001_3 is displayed by overlapping information regarding the touched content or the selected content. Here, the menu bar 1001_3 is overlapped with the touched content without hiding information of the touched content.

Figure 16:
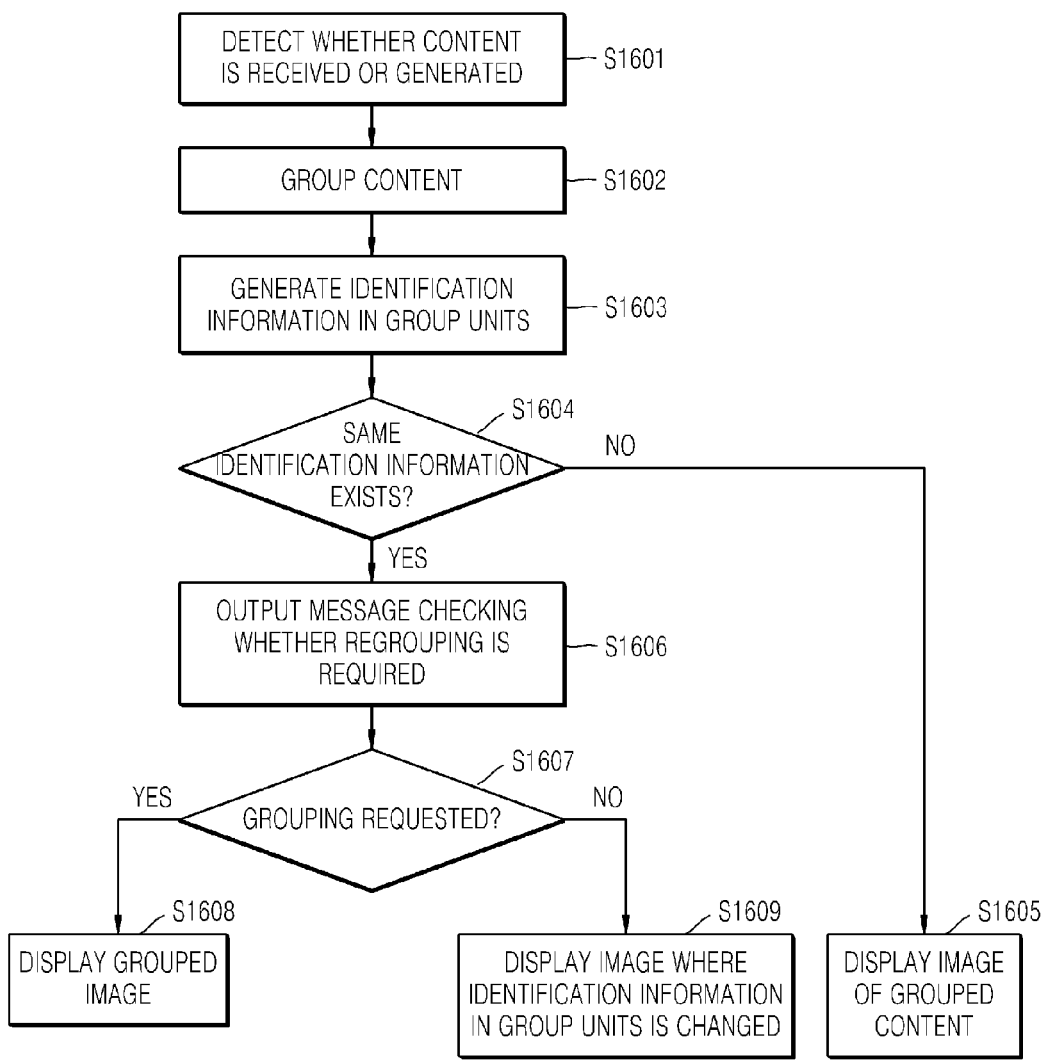
FIG. 16 is a flowchart illustrating a method of managing content, according to an embodiment of the present invention.

FIG. 16 is a flowchart illustrating a method of managing content, according to an embodiment of the present invention, wherein grouping is performed when identification information generated in group units is the same. Steps 1601 through 1603 of FIG. 16 are identical to Steps 901 through 903 of FIG. 9, as described herein.

Figure 17:
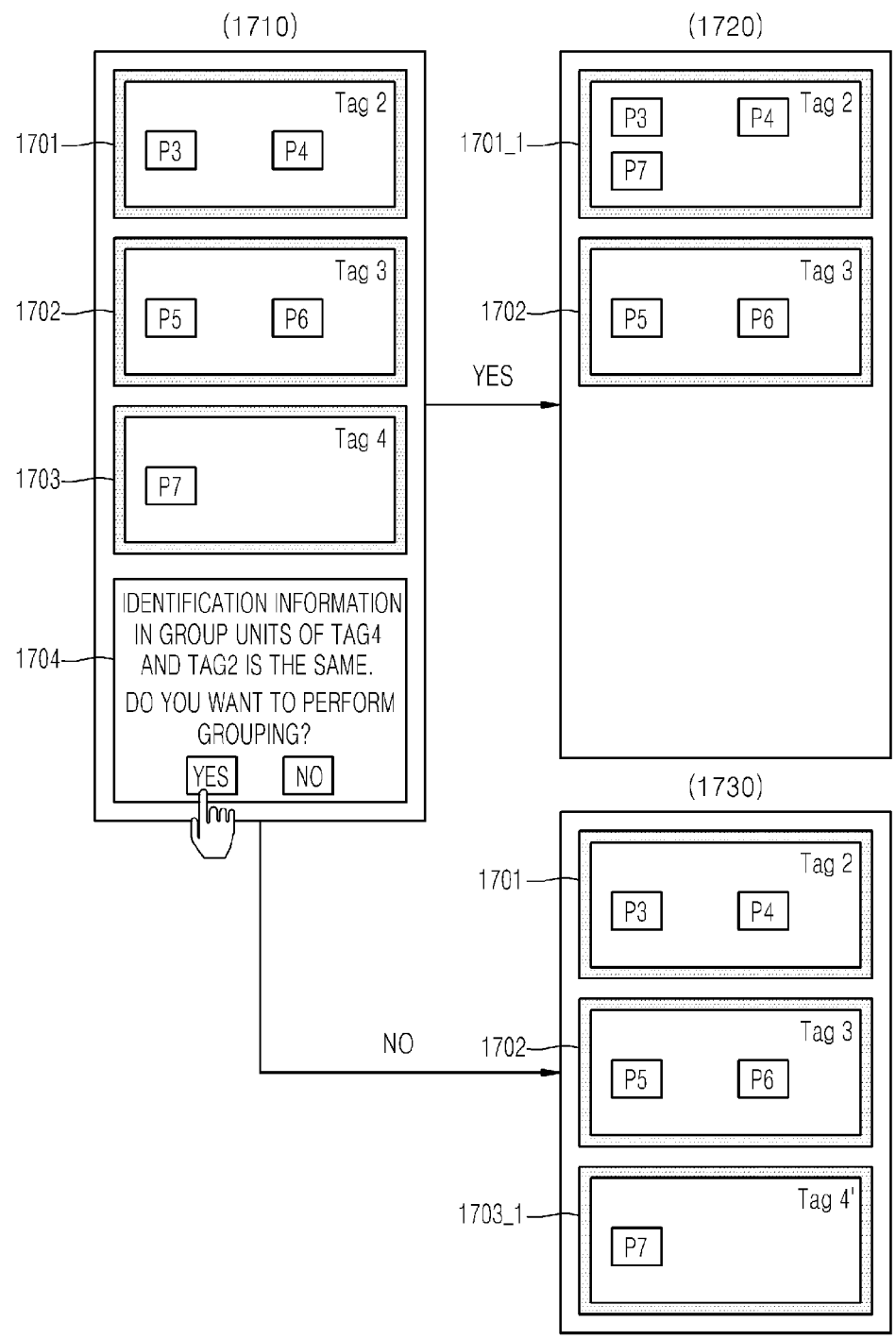
FIG. 17 is a diagram illustrating displaying of grouped content when identification information generated by a group is the same, according to an embodiment of the present invention.

Identification information regarding a newly generated group is generated in Step 1603, and the processor 150 determines whether the generated identification information is identical to any identification information regarding previously generated groups in Step 1604. If the identification information regarding the previously generated group exists, where the identification information is identical to the generated identification information, a message 1704 requesting input whether regrouping is required is displayed on the output unit 112 as illustrated by screen 1710 of FIG. 17, in Step 1606. FIG. 17 is a diagram illustrating displaying of grouped content when identification information generated according to group units is the same, according to an embodiment of the present invention. In a screen 1710 of FIG. 17, identification information Tag 2 of a second group 1701 and identification information Tag 4 of a fourth group 1703 are the same. Regrouping refers to grouping groups having the same identification information into one group.

If the user touches "Yes," based on a message 1704 on the screen 1710, the processor 150 determines that the user wants to group the groups having the same identification information in Step 1607, and groups the groups having the same identification information in Step 1608. Accordingly, a screen 1720 including a tablet 1701_1 including an image of regrouped content is displayed on the output unit 112.

Alternatively, if the user touches "No," based on the message 1704, the processor 150 determines that the user does not want to group the groups having the same identification information in Step 1607. Accordingly, the processor 150 changes the identification information in group units in Step 1609. Here, the identification information of a previous group is changed. Alternatively, the identification information of a newly generated group is changed. If the identification information of the newly generated group is changed, the screen 1710 displayed on the output unit 112 is changed to a screen 1730 including an image 1703_1 of the fourth group 1703 where identification information Tag4 of the fourth group 1703 is changed to identification information Tag4'.

If it is determined that the identification information of the previously generated group identical to the identification information of the newly generated group does not exist in Step 1604, the processor 150 outputs an image of grouped content including the generated identification information via the output unit 112.

In the above description, the image of grouped content is displayed over the whole screen of the output unit 112, but alternatively, the image of the grouped content is displayed on a part of the output unit 112 in a film form or in an up, down, left, or right scrollable form when a new group is generated or according to scrolling performed by the user.

The embodiments of the present invention can also be implemented as computer readable codes on a computer readable recording medium. The computer readable recording medium includes any data storage device that can store data which can be thereafter read by a computer system, such as Read-Only Memory (ROM), Random-Access Memory (RAM), Compact Disk (CD)-ROMs, magnetic tapes, floppy disks, optical data storage devices, and the like. The computer readable recording medium can also be distributed over a network coupled with computer systems so that the computer readable code is stored and executed in a distributed fashion.

Although various embodiments of the present invention have been described in detail herein, it will be apparent to those of ordinary skill in the art that various changes in form and detail may be made without departing from the spirit and scope of the present invention as defined by the appended claims.

What is claimed is:

1. A method of managing content in a device, the method comprising:
   detecting, at a processor of the device, whether content is received or generated at the device;
   generating, by the processor, a group comprising the received or generated content and another content;
   generating, by the processor, a tag of the group based on at least one of predetermined reference information required to group the received or generated content and a tag of the received or generated content, wherein the tag is indicative of each group;
   displaying a message that indicates that the tag of the group is identical to a tag of another group, based on a determination of whether the tag of the group is identical to the tag of the other group, and that requests input from the user regarding performance of generating a combined group that includes the group and the other group;
   generating, by the processor, the combined group and displaying content of the combined group on the device, when the input from the user, which is input to the message, approves performance of the generating the combined group; and
   changing, by the processor, a name of the tag of the group, when the input from the user, which is input to the message, disapproves performance of the generating the combined group,
   wherein the other content includes content received or generated before the detected received or generated content.

2. The method of claim 1, wherein displaying the content of the combined group comprises displaying information regarding the content of the combined group on one template.

3. The method of claim 2, wherein the information regarding the content displayed on one template includes an image based on a tag of the content.

4. The method of claim 1, wherein displaying the content of the combined group comprises moving display information regarding the content of the combined group in a first-in, first-out order.

5. The method of claim 1, wherein displaying the content of the combined group comprises displaying information regarding at least two groups.

6. The method of claim 1, wherein displaying the content of the combined group comprises updating information regarding the displayed content of the combined group such that an image of the received or generated content is included in a recently generated group, depending on whether a new group is generated, when the content is received or generated by the device.

7. The method of claim 1, wherein displaying the content of the combined group comprises updating information regarding the displayed content of the combined group such that the received or generated content is included in a new group according to generation of the new group when the content is received or generated by the device.

8. The method of claim 1, wherein the content is grouped according to time information and location information of the received or generated content.

9. The method of claim 1, wherein displaying the content of the combined group further comprises displaying the tag generated by group units.

10. The method of claim 1, further comprising displaying editing information regarding the content of the combined group displayed on the device, in response to an edit request regarding the content of the combined group.

11. An apparatus for managing content, the apparatus comprising:
   a storage device which stores at least one program;
   a user interface device which interacts with a user; and
   at least one processor configured to execute the at least one program,
   wherein the at least one program includes commands for detecting whether content is received or generated by the apparatus, generating a group comprising the received or generated content and another content, generating a tag of the group based on at least one of predetermined reference information required to group the received or generated content and a tag of the received or generated content, displaying a message that indicates that the tag of the group is identical to a tag of another group, based on a determination of whether the tag of the group is identical to the tag of the other group, and that requests input from the user regarding performance of generating a combined group that includes the group and the other group, generating the combined group and displaying content of the combined group on the device, when the input from the user, which is input to the message, approves performance of the generating the combined group, and changing a name of the tag of the group, when the input from the user, which is input to the message, disapproves performance of the generating the combined group,
   wherein the other content includes content received or generated before the detected received or generated content, and
   wherein the tag is indicative of each group.

12. The apparatus of claim 11, further comprising a buffer for temporarily storing the received or generated content for generating the group.

13. The apparatus of claim 11, wherein displaying the content of the combined group comprises displaying information regarding the content of the combined group on one template.

14. The apparatus of claim 11, wherein the at least one program further includes commands for displaying the generated tag and the content of the combined group together on the user interface device.

15. A non-transitory computer readable recording medium having recorded thereon a program for executing a method of managing content, the method comprising:
   detecting, at a processor of the device, whether content is received or generated at the device;
   generating, by the processor, a group comprising the received or generated content and another content;
   generating, by the processor, a tag of the group based on at least one of predetermined reference information required to group the received or generated content and a tag of the received or generated content, wherein the tag is indicative of each group;
   displaying a message that indicates that the tag of the group is identical to a tag of another group, based on a determination of whether the tag of the group is identical to the tag of the other group, and that requests input from the user regarding performance of generating a combined group that includes the group and the other group;
   generating, by the processor, the combined group and displaying content of the combined group on the device, when the input from the user, which is input to the message, approves performance of the generating the combined group; and changing, by the processor, a name of the tag of the group, when the input from the user, which is input to the message, disapproves performance of the generating the combined group, wherein the other content includes content received or generated before the detected received or generated content.

* * * * *